United States Patent
Leppanen et al.

(10) Patent No.: US 9,686,648 B2
(45) Date of Patent: Jun. 20, 2017

(54) METHOD, A SERVER AND A COMPUTER PROGRAM FOR LOCAL DISCOVERY

(75) Inventors: Tapani Antero Leppanen, Tampere (FI); Arto Tapio Palin, Viiala (FI); Kimmo Kalervo Kuusilinna, Tampere (FI); Timo Tapani Aaltonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 236 days.

(21) Appl. No.: 14/403,263

(22) PCT Filed: May 28, 2012

(86) PCT No.: PCT/FI2012/050511
§ 371 (c)(1),
(2), (4) Date: Nov. 24, 2014

(87) PCT Pub. No.: WO2013/178863
PCT Pub. Date: Dec. 5, 2013

(65) Prior Publication Data
US 2015/0163635 A1    Jun. 11, 2015

(51) Int. Cl.
*H04W 4/00* (2009.01)
*H04W 4/02* (2009.01)
(Continued)

(52) U.S. Cl.
CPC .............. *H04W 4/023* (2013.01); *H04L 67/16* (2013.01); *H04W 4/206* (2013.01); *H04W 8/005* (2013.01); *H04W 52/0212* (2013.01); *Y02B 60/50* (2013.01)

(58) Field of Classification Search
CPC ......... H04L 67/16; H04L 67/02; H04L 67/20; H04L 67/303; H04L 67/306; H04L 51/20; H04L 51/32; H04L 41/5058; H04W 4/02; H04W 4/008; H04W 4/023; H04W 8/005; H04W 64/00; H04W 4/021; H04W 76/02; H04W 64/003
USPC .... 709/217, 203, 227; 707/999.01, E17.108, 707/E17.115, E17.11, 999.004; 455/418, 455/414.1, 456.1, 456.3, 414.3, 404.1, 455/419
See application file for complete search history.

(56) References Cited

U.S. PATENT DOCUMENTS

| 6,549,768 B1 | 4/2003 | Fraccaroli |
| 7,280,822 B2 | 10/2007 | Fraccaroli |

(Continued)

FOREIGN PATENT DOCUMENTS

| EP | 1528823 A1 | 5/2005 |
| WO | 03083721 A1 | 10/2003 |

OTHER PUBLICATIONS

International Search Report and Written Opinion received for corresponding Patent Cooperation Treaty Application No. PCT/FI2012/050511 dated Feb. 28, 2013, 12 pages.
(Continued)

*Primary Examiner* — Fred Casca
(74) *Attorney, Agent, or Firm* — Mintz Levin Cohn Ferris Glovsky and Popeo, P.C.

(57) ABSTRACT

In a method for local discovery a request to make a search for at least one local service is received from at least one device. A search is performed by means of at least one service directory to discover the at least one local service. As a result of the search, information on such local services in proximity of the device is provided to the device.

13 Claims, 7 Drawing Sheets

(51) Int. Cl.
 *H04L 29/08* (2006.01)
 *H04W 4/20* (2009.01)
 *H04W 8/00* (2009.01)
 *H04W 52/02* (2009.01)

(56) References Cited

U.S. PATENT DOCUMENTS

| 2007/0118520 | A1* | 5/2007 | Bliss | G01C 21/367 |
| 2012/0042036 | A1* | 2/2012 | Lau | G06F 8/61 |
| | | | | 709/217 |
| 2012/0195295 | A1* | 8/2012 | Elmaleh | H04W 4/023 |
| | | | | 370/338 |
| 2013/0198277 | A1* | 8/2013 | Pedregal | G06Q 30/0282 |
| | | | | 709/204 |

OTHER PUBLICATIONS

Ververidis, et al. "Service Discovery for Mobile Ad Hoc Networks: A Survey 1-19 of Issues and Techniques". IEEE Communications Surveys. Jul. 1, 2008, vol. 1 0, No. 3, pp. 30-45, ISSN 1553-877X pp. 32 and 38.

Yang et al. "A New Approach to Service Discovery in Wireless Mobile Ad 1-19 Hoc Networks". IEEE International Conference on Communications, 2006 (ICC'06). Jun. 1, 2006, pp. 3838-3843, ISBN 1-4244-0354-5.

Kreutzer et al. A Toolbox of Mechanisms for Robust and Scalable Service Discovery in Mobile Ad-Hoc Networks. IEEE International Symposium on Integrated Network Management, 2007 (IM'07). May 1, 2007, pp. 487-496, ISBN 1-4244-0798-2.

Extended European Search Report received for corresponding European Patent Application No. 12877667.1, dated Dec. 8, 2015, 6 pages.

\* cited by examiner

METHOD, A SERVER AND A COMPUTER PROGRAM FOR LOCAL DISCOVERY

RELATED APPLICATION

This application was originally filed as Patent Cooperation Treaty Application No. PCT/FI2012/050511 filed May 28, 2012.

TECHNICAL FIELD

The present invention relates to device-to-device operation, and in particular to a local discovery of devices or services.

BACKGROUND

Server-based social interaction between users has developed to a device-to-device operation and sharing between users. In order to make the devices to interoperate with each other, they first have to find each other. One example is a technology-based operation, where users—at first—have to select a certain technology (Bluetooth, WiFi-direct, etc.) that is used to find the devices. Then the selected technology is used to find the other devices and the services available.

Social Devices is a concept that utilizes short radio operation. Devices (e.g. mobile phones, laptops, smartphones, consumer electronic devices, etc.) are configured to perform joint, collaborative actions when they are in the proximity of each other. The system can propose and start actions autonomously without user initiation. The actions are organized by a server in internet. The server can be responsible in selecting the proper action based on available devices, context information and user preferences, and organizing the devices to perform the action. Each device updates its context information to the server and executes specific parts of the joint action as instructed by the server. The device-side functionality is kept at minimum to make the system feasible on battery-powered devices; device only communicates with the server and with other devices, and executes actions as instructed. System does not require any peer-to-peer connectivity, therefore it works well with different consumer electronic devices as long as they have internet connection.

Device discovery is a time and power consuming operation. The time and power consumption are tightly interrelated. If faster detection/search time is needed, more power has to be used. In addition, the user is often expected to know which connectivity technology is used with certain application. In addition, the user needs to know when to perform the search. Therefore, there is a need for a more straightforward solution that requires less effort from the user.

BRIEF SUMMARY

Now there has been invented an improved method and technical equipment implementing the method, by which the above problems are alleviated. Various aspects of the invention include a method, a server and a computer readable medium comprising a computer program stored therein, which are characterized by what is stated in the independent claims. Various embodiments of the invention are disclosed in the dependent claims.

According to a first aspect, a method comprises receiving a request from at least one device to make a local search for at least one local service; performing the search by means of at least one service directory to discover said at least one local service; and as a result of the search, providing information to said at least one device on said at least one local service in the proximity of said at least one device.

According to an embodiment, wherein the information on the at least one local service also includes information on how to access the at least one service.

According to an embodiment, the information on how to access the at least one local service comprises data on which radio link to use.

According to an embodiment, the information on how to access the at least one local service comprises guidance on how to find a suitable radio link for the at least one service.

According to an embodiment, the method comprises defining proximity of said at least one device by same access point, by neighboring access point, by other observed radio transmission, by sensed data from the environment, by nearby coordinates.

According to an embodiment, the method comprises receiving the at least one service directory from at least one other device.

According to an embodiment, the service directory comprises information on the at least one other device's identification, the at least other device's service, the at least other device's resources, and the at least other device's connectivity/access.

According to an embodiment, wherein the request from the at least one device further comprises at least one of following: to search for a certain service, to search one or more services in a certain technology, to search all available services in all available technologies.

According to a second aspect of the present invention, a server comprises a processor, memory including computer program code, the memory and the computer program code configured to, with the processor, cause the server to perform at least the following: receiving a request from at least one device to make a local search for at least one local service; performing the local search by means of at least one service directory to discover the at least one local service; as a result of the search, providing information to said at least one device on said at least one local service in the proximity of said at least one device.

According to a third aspect of the present invention, a computer program, code for receiving a request from at least one device to make a local search for at least one service; code for performing the search by means of the at least one service directory to discover said at least one local service; and as a result of the search, code for providing information to said at least on device on said at least one local service in the proximity of said at least one device and information.

According to a fourth aspect of the present invention, a computer-readable medium encoded with instructions that, when executed by a computer, perform: receiving a request from at least one device to make a local search for at least one local service; performing the search by means of the at least one service directory to discover said at least one local service; as a result of the search, providing information to said at least one device on said at least one local service in the proximity of said at least one device.

In the solution the other device's service and resource information is appended with device's ad-hoc connectivity information. This combination is stored in the server and used for server-assisted ad-hoc connection between devices for direct device-to-device service/resource access.

DESCRIPTION OF THE DRAWINGS

In the following, various embodiments of the invention will be described in more detail with reference to the appended drawings, in which.

DETAILED DESCRIPTION OF THE EMBODIMENTS

In the following, several embodiments of the invention will be described in the context of local discovery of the devices. It is to be noted, however, that the invention is not limited to local discovery. In fact, the different embodiments have applications widely in any environment where devices are searched for data transmission.

In the following a certain terms are used that need to be defined in order to understand the concept of the present solution. In the description, term "device" relates to any electronic device: a handheld device, a mobile terminal, a mobile device, a smartphone, a personal computer, a laptop computer, a tablet computer, a personal digital assistant comprising software, a headset, a consumer electronics, such as a television, a display, a printer, etc. The electronic device may be able to connect to the internet, but this is not a requirement. "Service of the device", i.e. "service" relates to the purpose and/or functionality of the device. For example, device "printer" provides printing service, device "display" provides display services, device "headset" provides audio services. "Local service" on the other hand relates to a service of a device that is located in a certain proximity of another device requesting the local service. The proximity can be defined according to various positioning methods as described in more detail below.

The Social Devices concept as well as other somewhat similar solutions from smart space and mobile device clouds have in common the device-to-device interaction (i.e. collaborative applications or joint actions). In order to operate jointly, the systems may either create (1) a distributed, peer-to-peer system architecture based on ad-hoc connectivity or (2) centralized, cloud-based system architecture relying on all devices having a fast connection to internet. Such a distributed system does not necessarily require internet connection, but its data sets are likely to be limited compared to the centralized system. In addition, in the distributed system, there are limited possibilities to find all matching configurations (i.e. find all possible sets of devices that can perform an action based on the proximity, device capability, social distance, and to do this for all defined actions). The distributed system also has a difficulty to support heterogeneous devices (various device models and types with different ad-hoc connectivity technologies). The centralized system architecture requires internet or another common connection, but on the other hand it supports various device models and types with different connectivity technologies. So, there are cons and pros with both of the solutions, and therefore the present solution aims to utilize the benefits of both of the solutions to provide a server-assisted local discovery and ad-hoc connectivity to other devices' resources and services. After this, the communication happens on device-to-device basis.

Figure 1:
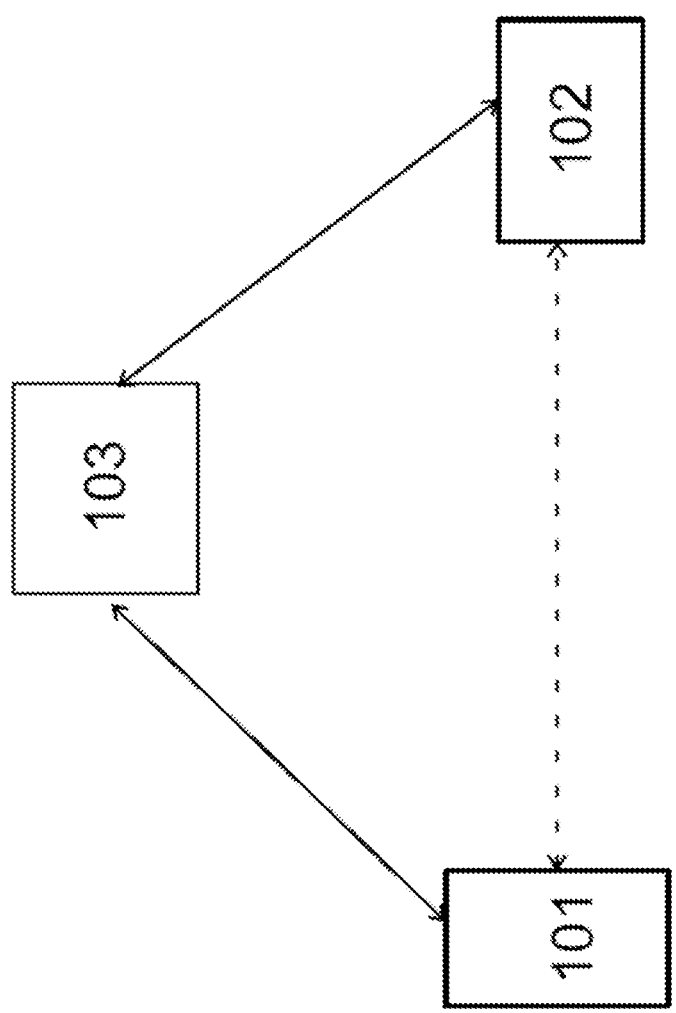
FIG. 1 shows a simplified example of an embodiment.

FIG. 1 illustrates the basic operation according to an embodiment. A device 101 and a device 102 are clients that report information to a server 103. The server 103 may store the received information and is able to do a local search on behalf of the device 101 or the device 102 or both based on this information. The server 103 is configured to return results of the local search to the device 101 or the device 102 or both. The device 101 and the device 102 does not need to have to activate their local search resources to do the local discovery. The dash line between devices 101 and 102 illustrates the direct communication between the devices after the server-assisted connection.

To simplify the solution even further, following hypothetical conversations illustrating the operation of the system are presented. For example, after a server has received device reports from a device, a display and a headset, the server is capable of providing the local discovery. Therefore, a device may ask the server "what kind of services are available in the proximity?", and the server is able to reply "there are a headset being a Bluetooth service and a display being a WLAN service". The device may also ask "are there any WLAN services in the proximity", to which the server is able to reply "a display service". Yet, further the device may ask the server "are there any headset services in the proximity" and the server replies "there is a headset service which is a Bluetooth service". In addition to the responses, the server is configured to include specific information on the service, e.g. a name, an address, a radio link, etc.

Figure 2:
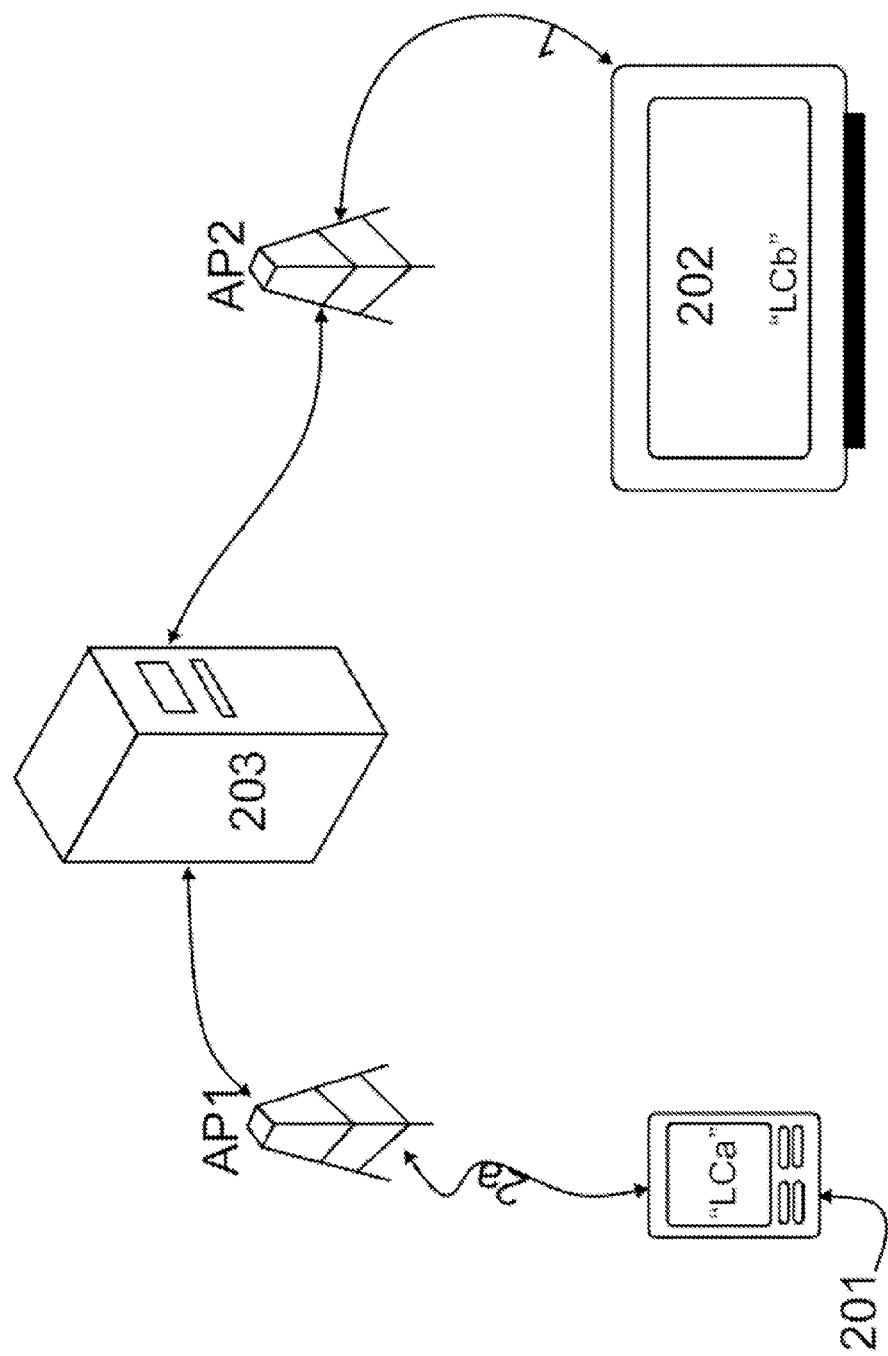
FIG. 2 shows an embodiment of the configuration of the devices.

FIG. 2 is an example configuration of the system according to an embodiment. In this example, a device 201 is a mobile device, which has a connection (2a) to the server 203 via access point AP1. Another device of the present example is a display 202 also having a connection (1) to the server 203 via access point AP2. The display 202 transmits its local connectivity information (LCb) to the server 203 through the connection (1). The server may have a general fixed address (e.g. www.localsearch.com) to which the local connectivity information is transmitted, or the server can be proximity related, which means that general server could organize information into smaller pieces according to access points being located in a certain area. Partly this can be done by the information provided by the devices (connected to AP with MAC address).

The local connectivity information (LCb) of the display 202 may also include device information of the display. Device information (i.e. device report) includes the identification of the device, the services provided by the device (i.e. service directory) and instructions on how to use those services. In addition, information on the access point AP2 is transmitted to the server, either by the display 202, or the server 203 automatically detects the used access point. In this example, the information on the access point (AP2) relates to WLAN access point. The server may be configured to store the received service directory and the local connectivity information.

The device 201 is within coverage area of the access point (AP1). The information on the access point (AP1) and the local connectivity information (LCa) of the device 201 are transmitted to the server 203. This information may be stored by the server 203. By means of the received information, the server 203 is aware that the device 201 is within the coverage area of first access point (AP1) and the display 202 is within the coverage area of the second access point (AP2).

Figure 3:
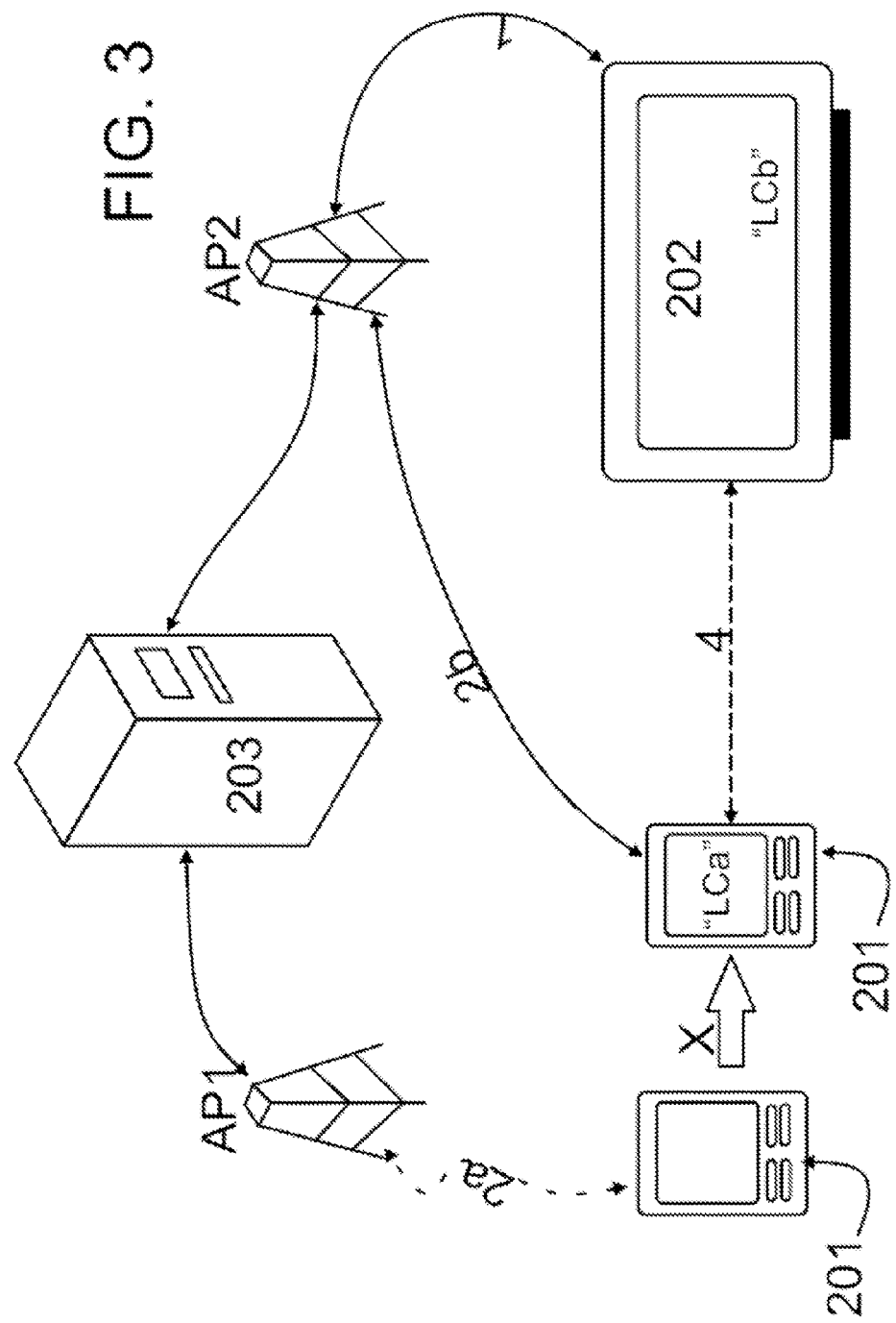
FIG. 3 shows another embodiment of the configuration of the devices.

At the time the device 201 moves under the second access point (AP2) as shown by the arrow X in FIG. 3, and forms a connection (2b) with it, the server 203 is informed on this.

The server 203 thus knows that the display 202 and the device 201 are under the same access point (AP2). Now, the server 203 may provide information on the display 202 to the device 201. This means that the server 203 informs the device 201 of the available service provided by the display 202. If the device 201 is interested in using the service provided by the display 202, the device 201 can form a local connection (4) towards the display 202 by means of the information obtained from the server 203. Therefore, the device 201 does not need to do any search with local connectivity techniques by itself.

It is to be noticed that in the example of FIGS. 2 and 3, the server 203 is configured to transmit information on any available service within the coverage area of the same access point as where the device 201 is located. However, it is also possible that the device 201 asks especially for display services, whereby the server 203 returns this information or a notification that the local display services are not available when the device is within the coverage area of AP1. It is also possible that the device 201 asks especially any service within the same coverage area, whereby the server 203 returns—not only the display service provided by the display 202—but also any other service that is available within this coverage area. It is also possible that the device 201 asks for any service, whereby the server 203 is configured to return information on—not only the display service provided by the display 202 under the WLAN access point (AP2)—but also other services provided by other devices under other available access technology, e.g. Bluetooth.

Figure 4:
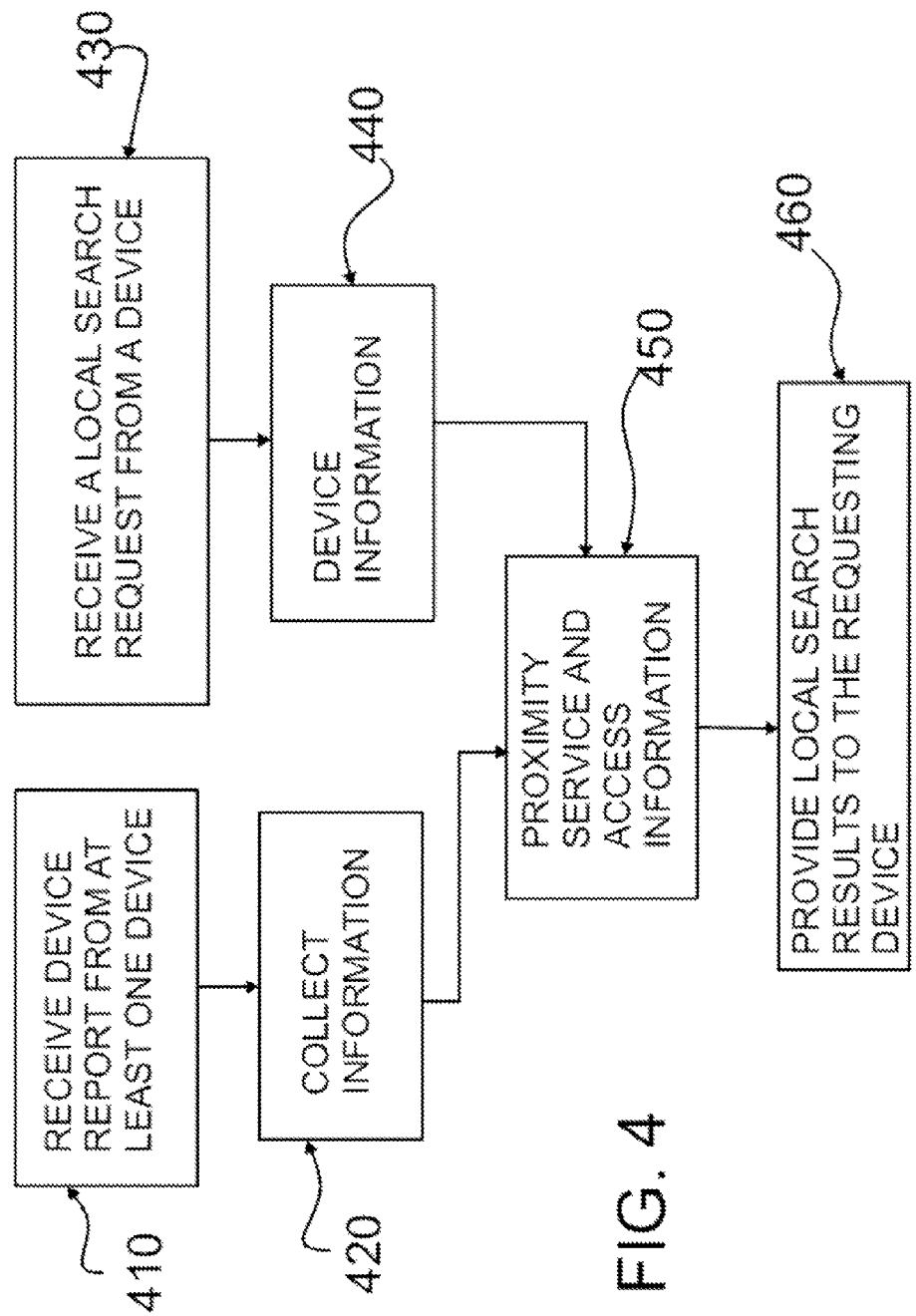
FIG. 4 shows an embodiment of the server side search process.

An example of the search process by the server is shown in FIG. 4. The device information in the form of a device report is provided by any device that is part of the server operation. The device report can comprise: device identification, device access information (e.g. Bluetooth address (BD_ADDR), wireless local area network's address (WLAN MAC), internet protocol address (IP)), service information on the services the device has and device's capability to detect information over wireless interface (e.g. BD_ADDR+RSSI, WLAN AP info+RSSI, time stamp). This device report is received (410) by the server, which may be configured to store the device report and to collect (420) the necessary information from that. In this example, the device is configured to transmit the device report by its own initiative. However, in some situations, the server may be configured to utilize e.g. indoor positioning systems to locate a device. When the device is located in such a manner, the server may request the device to provide the device report. The server functionality can be executed in one or more server device or it can be distributed to one or more participating device.

In one example of the server-based search, a device is configured to ask (430) the server to perform a local search, as in FIG. 4. The server receives (440) the device information of the requester. The device information comprises at least the device identification and the access technologies that the device supports. The proximity service and access info process (450) compares the data (from one or more device reports and from device information of the requesting device) in the server in order to discover the services which are in the proximity of the requesting device and which are accessible with the access technologies the requesting device supports.

The result of the local search are returned (460) to the requesting device. In this example, the result comprises a list of local services in the proximity and instructions how to access them (i.e. which radio link should be used). In the example of FIG. 3, the display 202 and the device 201 have the same access point information (i.e. the display and the device are within the coverage area of the same access point (AP2)). Then the proximity detection can provide display's address and service information to the device 201.

Further, the server may provide additional guidance for devices to perform further actions to determine connectivity or other system properties. For example in FIG. 2, the server may guide device 201 to change the access point from the first access point (AP1) to the second access point (AP2) in order to utilize the display (202) service. Also, because the server can compare access points, the server may not be sure, whether the device and the display can also use Bluetooth to connect. Therefore, it is also possible (in a situation of FIG. 2) that the server 203 requests the display 202 to do a Bluetooth inquiry to find out if the device 201 can be connected. This Bluetooth scanning may be done by the display (or any device with a mains connection) in order to save the other device's power. Still, the operation is as fast as if it were done by the device. If the device is not visible, the server can request the display to try to connect to device directly (because address of the device is known from the device report), e.g. by doing Bluetooth SDP (Service Discovery Protocol) query to the device. This way the server can operate on the background and construct a more complete set of discovery information and structures that would be possible for the local device by itself.

In addition, if the server is aware that a certain device has e.g. a WLAN functionality but notices that the device hasn't activated the WLAN functionality, the server may instruct the device to turn the WLAN on.

Figure 5:
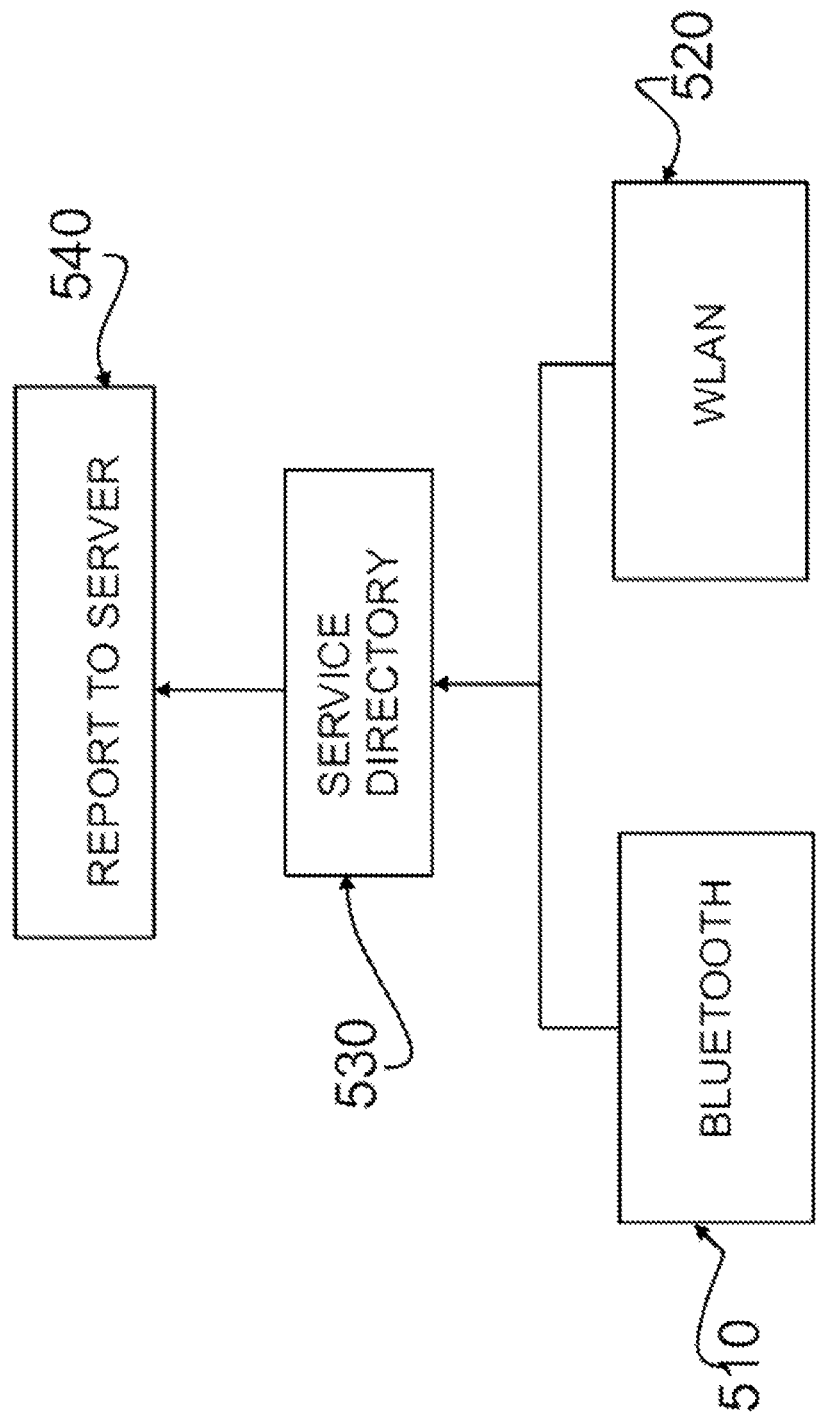
FIG. 5 shows an embodiment of the client side reporting process.

FIG. 5 illustrates an example of client side reporting functionality. The client is configured to collect all its service and access information to a service directory (530). In the example of FIG. 5, the supported access technologies are Bluetooth (510) and WLAN (520). However, the amount and type of access technologies may vary greatly from the example of FIG. 5. In addition to the access technologies, also service information may be included. In addition, the client can add information on the detected devices and services to the service directory. This information is reported (540) to the server whenever the client prefers, but typically when any or certain information in the service directory has been changed. Also, the server may request the device to provide the service directory.

Figure 6:
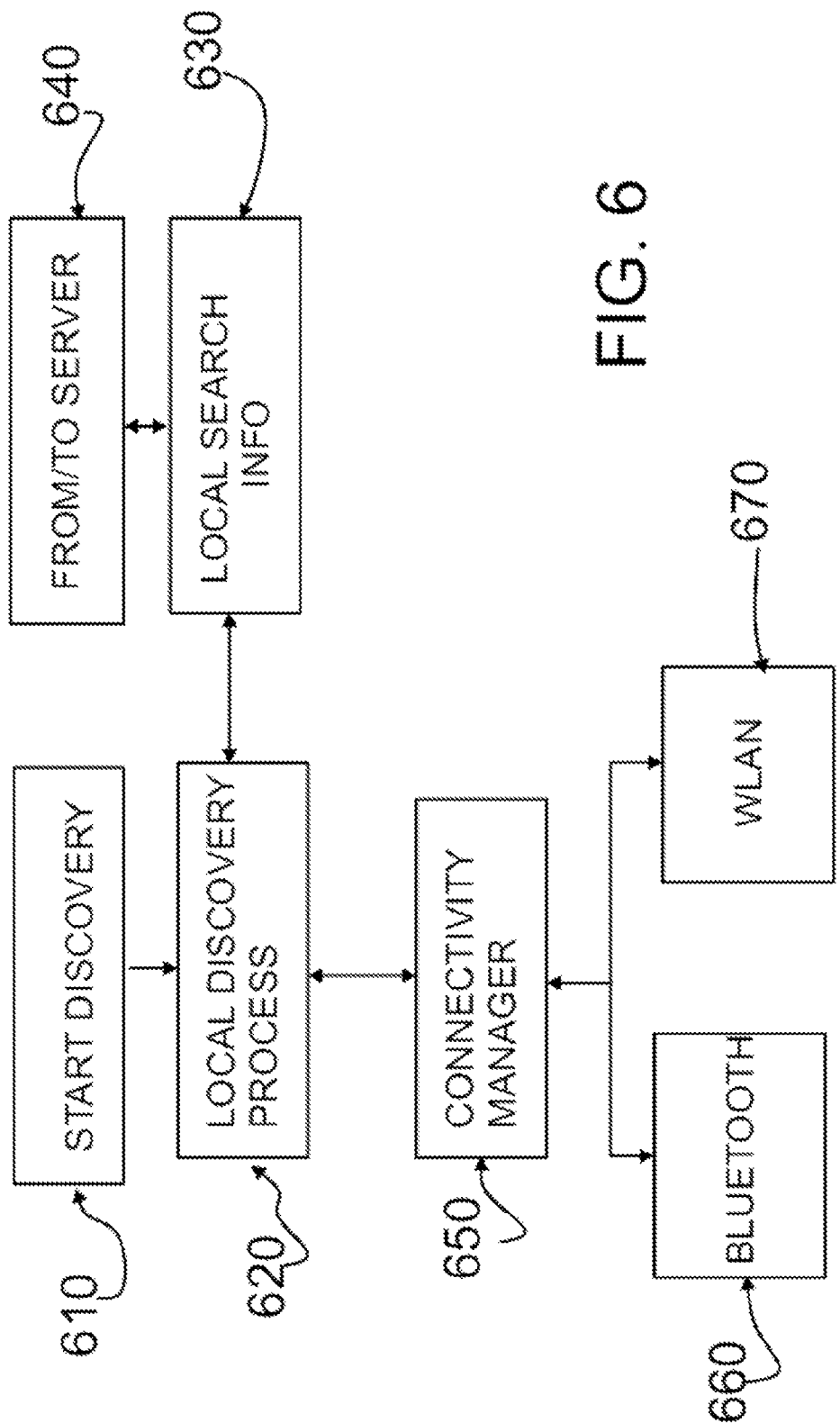
FIG. 6 shows an embodiment of the client discovery process.

FIG. 6 illustrates an embodiment for device-to-device connectivity. A device starts (610) the local discovery process (620). The local discovery process (620) is configured to check the local search information (630) from the server (640). The server can provide local search information (i.e. local search results, see FIG. 4: 460) automatically to the device. For example, the server can recommend services based on current context that is available in the proximity to the device or operate on per request basis (e.g. device is searching for a specific service). If the local search information is nonexistent or old in the server, the device is able to do a normal discovery process with any appropriate connectivity techniques (650). A connectivity manager (650) may monitor the available network connections, e.g. Bluetooth (660) and/or WLAN (670) and/or IP and/or mobile network etc.) The local discovery process (620) can perform the local discovery as usually but the server (640) provides the results if available at the server. Hence, the local discovery process (620) does not need to differentiate the server based local discovery from the local discovery performed by the connectivity manager (650).

Devices that don't have a connection to the server (internet), can actively utilize the other devices to pass their location and capabilities to the server. Using this information, the server can guide searching devices to search for such a service or device. For example, a Bluetooth headset may not be capable of connecting to the server. However, another device having the connection may inform the server that a headset with Bluetooth capabilities can be found from a certain location (can be defined by coordinates obtained from satellite based positioning system (e.g. GPS) or indoor positioning system etc.) Now, even though the server does not see the headset, the server can provide information (at least the address) on the available headset to the devices being in the proximity to the headset.

In the previous, an embodiment for performing a local search has been described. In the embodiment, the server is configured to make the search for available services and access technologies, and to provide such information to a device. By means of such information, the device can utilize the service directly. This is a great advantage compared to the earlier solutions, where the server is utilized also when the service is used. For example, a device having registered a capability of posting images using "http" and a display having registered a capability to run a web server and to display "jpeg" images posted to it, are in the proximity of each other. In order to use display's service, the device need to update context information to the server: photo browser application open, viewing image004.jpg. Then the server is configured to instruct display to run the web server and to instruct device to post image004.jpg to the server. The server receives the image and posts it to display. It is realized that this kind of operation increases the traffic to/from the server and loads the server. However, when the server is only used for discovering services, and the device forms the connection and uses the service directly, the server may concentrate on the discovery process.

Figure 7:
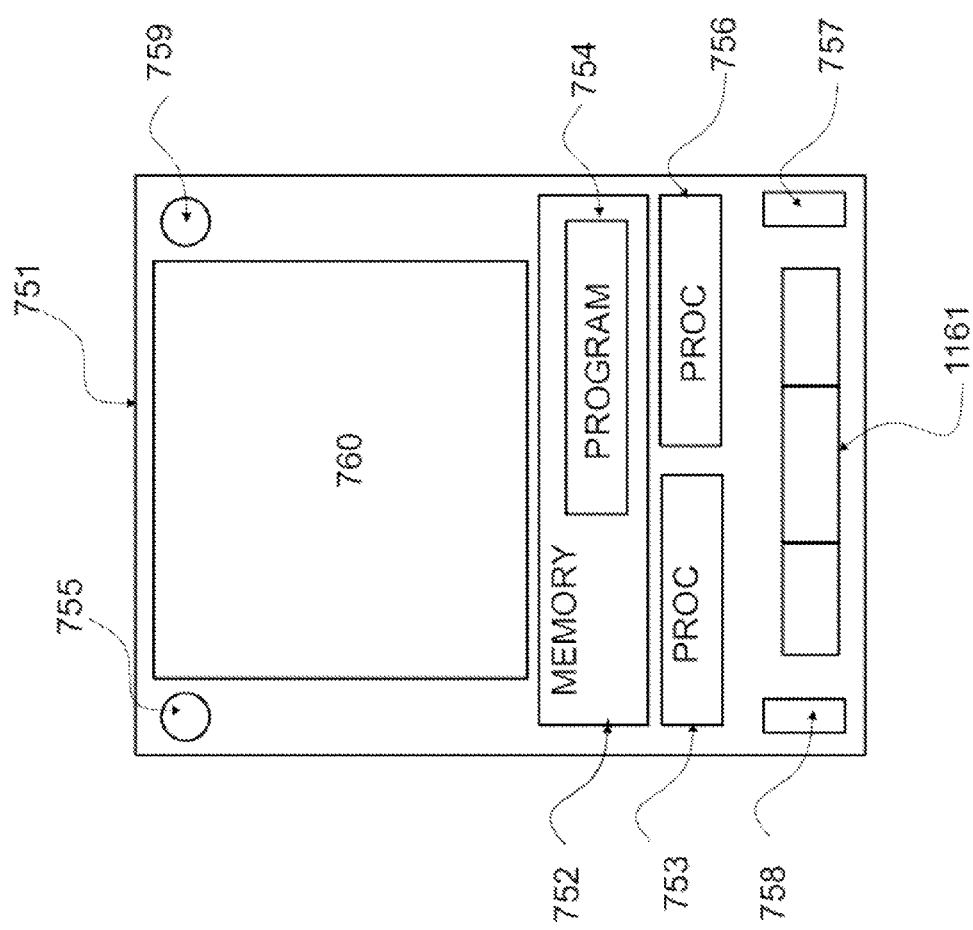
FIG. 7 shows a client device according to an embodiment.

FIG. 7 shows a client device according to an example embodiment. The client device 751 contains memory 752, at least one processor 753 and 756, and computer program code 754 residing in the memory 752. The client device may also have one or more cameras 755 and 759 for capturing image data, for example stereo video. The client device may also contain one, two or more microphones 757 and 758 for capturing sound. The client device may also comprise a display 760. The device 751 may also comprise an interface means (e.g., a user Interface) which allows a user to interact with the client device. The user interface means may be implemented using a display 760, a keypad 761, voice control, or other structures. The client device may also be connected to another device e.g. by means of a communication block (not shown in FIG. 7) able to receive and/or transmit information. It needs to be understood that different embodiments of the device allow different parts to be carried out in different elements.

The server device may comprise memory, at least one processor and a circuitry and electronics for handling, receiving and transmitting data. The server device comprises computer program code in the memory, wherein the one or more processors cause the server device to carry out the features of an embodiment when running the computer program code. The server device may also comprise an interface means which allows a user to interact with the server device. The server device may also be connected to another device e.g. by means of a communication block able to receive and/or transmit information.

The embodiments of the solution provide a direct device-to-device operation and sharing with seamless device connectivity. This can be achieved by providing local service discovery information over wide area server-based system and direct device-to-device access based on this information. The server-based system has the capability to track units and provide local device and service discovery results without the effort of devices themselves initiating local device and service discovery. In addition, instead of providing service information based on certain technology, by present embodiments it is possible to discover any service with any access technology and to be reported to the device (if requested).

It is obvious that the present invention is not limited solely to the above-presented embodiments, but it can be modified within the scope of the appended claims.

The invention claimed is:

1. A method comprising:
   receiving, at a server, a plurality of device reports comprising indications of identities for one or more devices, the plurality of device reports further comprising indications of at least one access technology capability for the one or more devices;
   generating, based on at least the plurality of device reports, at least one service directory at the server;
   receiving, at the server, another service directory from at least one second device, the other service directory including information on at least one device, at least one associated identifier, and at least one associated access technology capability;
   modifying, at the server, the at least one service directory based on the other service directory;
   receiving, at the server, a request from a first device to search for at least one service in proximity to the first device;
   performing, at the server and based on at least the plurality of device reports, the search to discover the at least one service; and
   providing, by the server and after the search, information on the at least one service to the first device, wherein the information on the at least one service comprises an indication of an access point to access the at least one service.

2. A method according to claim 1, wherein the information on the at least one service includes information on how to access the at least one service.

3. A method according to claim 1, wherein the plurality of device reports further comprises information on one or more access points associated with the one or more devices.

4. A method according to claim 1, wherein the proximity of the at least one device is defined based upon at least one of a shared access point, a neighboring access point, observed radio transmissions, data sensed from the environment, and geographical coordinates.

5. A method according to the claim 1, wherein the associated identifiers includes an internet protocol address, a Bluetooth address, or a wireless local area network address.

6. A method according to claim 1, further comprising:
   receiving, at the server, at least one of a request to search for a certain type of device, a request to search one or more services based on a specified access technology, and a request to search all available services in all available access technologies.

7. An apparatus comprising:
   at least one processor; and
   at least one memory including computer program code, the at least one memory and the computer program code configured to, with the processor, cause the apparatus to at least:

receive a plurality of device reports comprising indications of identities for one or more devices, the plurality of device reports further comprising indications of at least one access technology capability for the one or more devices;

generate, based on at least the plurality of device reports, at least one service directory;

receive another service directory from at least one second device, the other service directory including information on at least one device, at least one associated identifier, and at least one associated access technology capability;

modify the at least one service directory based on the other service directory;

receive a request from a first device to search for at least one service in proximity to the first device;

perform, based on at least the plurality of device reports, the search to discover the at least one service; and provide, after the search, information on the at least one service to the first device, wherein the information on the at least one service comprises an indication of an access point to access the at least one service.

8. An apparatus according to claim 7, wherein the information on said at least one service includes information on how to access the at least one service.

9. An apparatus according to claim 7, wherein the plurality of device reports further comprises information on one or more access points associated with the one or more devices.

10. An apparatus according to claim 7, wherein the proximity of the at least one device is defined based upon at least one of a shared access point, a neighboring access point, observed radio transmissions, data sensed from the environment, and geographical coordinates.

11. An apparatus according to claim 7, wherein the associated identifiers includes an internet protocol address, a Bluetooth address, or a wireless local area network address.

12. An apparatus according to claim 7, wherein the apparatus is further caused to at least:

receive at least one of a request to search for a certain type of device, a request to search one or more services based on a specified access technology, and a request to search all available services in all available access technologies.

13. A non-transitory computer-readable medium encoded with instructions that, when executed by a computer, perform operations comprising:

receiving a plurality of device reports comprising indications of identities for one or more devices, the plurality of device reports further comprising indications of at least one access technology capability for the one or more devices;

generating, based on at least the plurality of device reports, at least one service directory;

receiving another service directory from at least one second device, the other service directory including information on at least one device, at least one associated identifier, and at least one associated access technology capability;

modifying the at least one service directory based on the other service directory;

receiving a request from a first device to search for at least one service in proximity to the first device;

performing, based on at least the plurality of device reports, the search to discover the at least one service; and providing, after the search, information on the at least one service to the first device, wherein the information on the at least one service comprises an indication of an access point to access the at least one service.

* * * * *